3,135,767
REDDISH LIQUID PRODUCT OBTAINED FROM A PETROLEUM SOLVENT EXTRACTION OF OXIDIZED FRIEDEL-CRAFTS ACYLATION DERIVATIVES OF AROMATIC PETROLEUM EXTRACTS
George W. Ayers, Chicago, and William C. Allinder, Arlington Heights, Ill., assignors to The Pure Oil Company, Chicago, Ill., a corporation of Ohio
No Drawing. Filed June 5, 1961, Ser. No. 114,677
1 Claim. (Cl. 260—327)

This invention relates to novel high-molecular-weight organic acids and to a method for their preparation from petroleum fractions rich in complex, high-molecular-weight, condensed-ring, alkyl-substituted, aromatic and/or heterocyclic compounds which form the source of the organic nuclei for the acids and further characterize the acids by the physical and chemical nature of such source materials.

The prior art recognizes many methods of preparing organic acids from hydrocarbon materials. However, the nature of the starting materials for these prior art reactions is generally simple, that is, the hydrocarbons are pure and of relatively simple known structures. Partial air oxidation is to a limited extent a means of producing some specific oxygenated substances. High-boiling mineral oils and waxes from petroleum have been air-oxidized to form mixtures of higher carboxylic acids similar to those derived from fats (fatty acids) and suitable for making soaps. The oxidation of paraffinic hydrocarbons by chemical reagents in some special instances is only of theoretical interest. Normal hydrocarbons are resistant to reaction with potassium permanganate, but certain branched-chain hydrocarbons can be oxidized by this reagent. The presence of a tertiary carbon atom in the structure of the hydrocarbon opens attack by permanganates and nitric acid, but side reactions are prevalent. Recently, interest has been generated in using oxygen and/or water and metal catalyst to oxidize simple aromatic hydrocarbons to phenols, phenyl benzoate, and the like, which upon further treatment yield benzoic acid and related compounds. Another route is metallation of the aromatic hydrocarbon with a reactive alkali metal, followed by carbonation and acidification. Also, it is known to oxidize certain methyl phenyl ketones to dibasic acids by using such reagents as hypochlorite solutions. The application of these and related methods to prepare acids from complex source materials, particularly complex high-molecular-weight aromatic compounds, as herein further characterized, is beset with low yields, side reactions and complexities of a technical nature, although some recent notable advances have been made in these methods. Further, the oxidation of complex, aromatic source materials, such as solvent extracts obtained in the solvent refining of mineral lubrication oils, as hereinafter characterized as the preferred source material for the instant reaction, under closely controlled conditions is difficult, and substantial yields of well-defined acidic products are not obtained. Chemical oxidation of these materials with potassium dichromate and sulfuric acid yields material of a tar-like consistency which is difficult to refine into useful products. When solvent extracts are oxidized under more controlled conditions using aqueous sodium hypochlorite solution, ill-defined products are obtained which are equally resistant to refining and acid separation.

In accordance with this invention, novel organic acids are prepared by a process involving acetylation of the mixed high-molecular-weight aromatic source material in the presence of a Friedel-Crafts catalyst, oxidation of the resulting acetylated product, extraction of the unreacted materials, and acidification to convert the resulting salts to the free acids. More specifically, the complex, aromatic source material is treated with acetyl halide or acetic anhydride at a temperature of about 20° to 100° C. in the presence of a Friedel-Crafts catalyst, the acetylated product is oxidized by prolonged contact with a dilute aqueous solution of a hypochlorite, hypobromite, or hypoiodite salt at a temperature of about 50° to 120° C., and the resulting product, with or without extraction of the unreacted materials, is acidified with a mineral acid, at a temperature of about 50° to 120° C., to form the free acid product.

Now, in accordance with this invention, we have discovered that extract oils and other mixtures of high-molecular-weight aromatic compounds, or pure compounds, can be readily acetylated in the presence of a Friedel-Crafts catalyst to yield modified mixtures which are far more readily oxidizable than the original mixtures. The modified mixtures are easily oxidized by prolonged treatment with dilute aqueous hypochlorite solutions to yield a plastic-like solid material which is separable by heptane (or other, similar aliphatic solvent) extraction into two well-defined products. One of the products is a powdery solid composed of the sodium salts of high-molecular-weight organic acids. The other is a very viscous liquid.

The free acids can be obtained from the powdery sodium salts by treatment with a mineral acid; they are insoluble in water and have moderately high acid neutralization numbers. The sodium salts are sparingly soluble in light petroleum oils, and may be expected to have anti-static properties. The viscous liquid product may be expected to be useful as a plasticizing agent.

In our process, either acetic anhydride or acetyl chloride may be used to acetylate the starting material. We have found that other acid chlorides and anhydrides do not give materials which are as readily oxidizable as the products obtained when acetyl chloride or acetic anhydride is employed. In the acetylation, any amount of acetyl chloride or acetic anhydride actually capable of being taken up by the starting material (mixed aromatics) may be employed; preferably, 1–2 moles of acetylating agent are used per mole of aromatics. The temperature at which the acetylation reaction is conducted is important only insofar as it insures that the reaction occurs. Thus, moderately elevated temperatures are most suitable. Preferably, one mole of Friedel-Crafts catalyst, such as anhydrous aluminum chloride, is used per mole of acetylating agent. Other Friedel-Crafts catalysts, such as anhydrous ferric chloride or fused zinc chloride, may be used, but anhydrous aluminum chloride or bromide is preferred.

Any aromatic extract or extract mixture obtained from the manufacture of neutrals or bright stock may be used as the starting material for our process. Other starting materials, such as Edeleanu extract from the refining of kerosine, higher-boiling coal-tar oils, hydroformate bottoms, and other high-boiling aromatic mixtures, or even high-boiling aromatic hydrocarbons themselves, may also be used as starting materials for our process. However, when relatively pure high-boiling hydrocarbons are used, there may be no by-product viscous oil, in which case the aliphatic solvent extraction step of our process may be omitted.

For the oxidation step in our process, the hypochlorite concentration in the aqueous treating solution should be less than about 20%, and the solution should contain at least 0.1% w. of free caustic to minimize chlorination of the modified aromatics mixtures. Hypobromites and hypoiodites may also be used as the oxidizing agent in our process. Sufficient oxidizing agent in dilute aqueous solution, should be used to cause extensive oxidation of the modified starting material. Thus, the preferred amount of 5% hypochlorite oxidizing solution is 10–20 gallons per pound of acetylated starting material, but as much as ten times this amount may be necessary in some cases.

In order to illustrate the invention, the following non-limiting examples are given:

EXAMPLE I

A mixture of 175 g. of solvent extract (No. 19 of Table I), 39.3 g. of acetyl chloride, and 67 g. of anhydrous aluminum chloride was stirred mechanically for 2¾ hours at 41°–57° C., after which the product was cooled to room temperature and washed with water. Twenty grams of the black acetylated extract was then stirred for 19 hours at 70°–80° C. with 800 cc. of 5% sodium hypochlorite solution (Clorox) and 2 g. of sodium hydroxide. During this period, the color of the acetylated extract rapidly changed from black to yellow, and 17.9 g. of a brownish-yellow solid was deposited. The solid was removed, washed thoroughly with water, and dried. A 12.4 g. portion of it was extracted with two 100 cc. portions of n-heptane, leaving 6.6 g. of a yellow, powdery solid composed of the sodium salts of high-molecular-weight organic acids. The overall yield of solid sodium salts was 59% w., based on the weight of the original solvent extract, No. 19.

One gram of the yellow sodium salts was heated with 20 cc. of 5 N hydrochloric acid for 30 minutes, yielding the free organic acids as a brown solid. The free acids had an acid neutralization number of 45.

The n-heptane was removed from the solution obtained by extraction of the crude oxidation product, leaving a very viscous, clear, reddish liquid residue having essentially no acidity. This liquid had plasticizing properties, as shown by the following experiment. A mixture of equal parts by weight of polyvinyl chloride (Geon 121) and dioctyl phthalate was heated at 320° F. for 5 minutes, yielding a resilient plasticized product. In a similar experiment in which the dioctyl phthalate was replaced by a mixture of equal parts by weight of dioctyl phthalate and of the viscous, clear, reddish liquid residue mentioned previously, a resilient plasticized product was also obtained, showing that a large portion of the dioctyl phthalate plasticizer can be replaced successfully with the viscous, clear, reddish liquid residue of the instant process.

EXAMPLE II

A mixture of 80 g. of solvent extract (No. 19 of Table I), 35.9 g. of acetyl chloride, and 61.3 g. of anhydrous aluminum chloride was stirred mechanically for 35 minutes at 46°–56° C. After the black product had been washed with water, it weighed 89.9 g. Then a mixture of 20 g. of this product, 800 cc. of 5% sodium hypochlorite solution, and 2 g. of sodium hydroxide was stirred mechanically for 19¼ hours at 70°–80° C. During this period, the color of the acetylated extract changed rapidly from black to yellow, and a brownish-yellow solid formed. No further work was carried out on this crude product because of its apparent similarity to the product of Example I.

EXAMPLE III

One gram of solvent extract (No. 19 of Table I), 200 cc. of 5% sodium hypochlorite solution, and 0.5 g. of sodium hydroxide were stirred together for 5½ hours at 70°–80° C. The black color of the extract changed to yellow at a very much slower rate than in Examples I and II where the extract had been acetylated before it was exposed to oxidizing conditions. Moreover, the brownish-yellow product was a sticky, oily material from which the separation of discrete products would have been difficult.

EXAMPLE IV

A mixture of 80 g. of solvent extract (No. 20 of Table No. I), 40 g. of acetyl chloride, and 80 g. of anhydrous ferric chloride was stirred mechanically for five minutes while the temperature rose spontaneously from 25° C. to 64° C. and the mixture set to a black, solid product. After standing from three hours, ten grams of the black acetylated extract was contacted for 2.5 days with a solution of 0.5 gram of sodium hydroxide in 200 cc. of 5% sodium hypochlorite solution. The yellow brown solid product formed exhibited characteristics indicating the presence of high-molecular-weight organic acids.

EXAMPLE V

A mixture of 80 g. of solvent extract (No. 21 of Table I), 40 g. of acetyl chloride, and 78 g. of fused zinc chloride was stirred mechanically for three hours at 45–54° C. Water was then added and the tarry material was separated and washed twice with water. Five grams of the acetylated product was stirred mechanically for 12 hours at 70–80° C. with 400 cc. of 5% sodium hypochlorite solution containing 1.0 g. of sodium hydroxide. A yellow-brown solid product was formed which exhibited characteristics indicating the presence of high-molecular-weight organic acids.

EXAMPLE VI

A mixture of 80 g. of solvent extract (No. 22, Table I), 40 g. of acetyl chloride, and 70 g. of anhydrous aluminum bromide is stirred mechanically for one hour at 50° C. The resulting product is washed with water, and the residue is stirred with 800 cc. of 10% sodium hypochloride solution and 2 g. of sodium hydroxide for about 24 hours. The temperature is maintained at 75° C. A brownish-yellow solid product is formed which exhibits characteristics indicating the presence of high-molecular-weight organic acids.

EXAMPLE VII

A mixture of 20.2 grams of pyrene, 27 grams of anhydrous aluminum chloride, and 100 grams of carbon disulfide is stirred while 15.7 grams of acetyl chloride is added drop-wise until reaction has ceased. The carbon disulfide is then removed by distillation and water is added gently to the product along with a small amount of hydrochloric acid until all of the aluminum chloride is dissolved. After washing the separated insoluble acetylated product once with water, it is stirred mechanically for 20 hours with 600 cc. of 5% aqueous sodium hypochlorite solution. The separated sodium salts of the high-molecular-weight acids derived from the pyrene are washed with water.

The source material for the reaction of this invention may be a pure, relatively simple, aromatic or heterocyclic compound, such as the following two-ring-system compounds: indene, courmarone, thianaphthene, isothianaphthene, indole, benzofuran, naphthalene, pyrazine, quinoline, isoquinoline, and alkyl substitution products thereof; the following three-ring-system compounds: acenaphthene, fluorene, carbazole, anthracene, phenanthrene, xanthene, thianthrene, thiophenanthrene, dibenzothiophene, phenazine, and alkyl substitution products thereof; and also the following four-ring-system compounds: naphthacene, chrysene, pyrene, fluoranthene, triphenylene, chrysofluorene, and alkyl substitution products thereof.

A preferred source material for the reaction comprises the well-known by-product solvent extracts of mineral lubricating oils. These so-called solvent extracts are adequately described as those aromatic materials separated from mineral lubricating oils and their fractions, i.e., those aromatics obtained in the manufacture and refining of neutral oils and bright stocks during treatment with a selective solvent designed to extract the predominantly aromatic materials from the more paraffinic materials. Solvent extracts resulting from the treatment of mineral lubricating oils for the purpose of separating non-aromatic hydrocarbons (the raffinate and finished oil) from the aromatic hydrocarbons (the extract and waste product) may be used and are preferred as starting materials.

Since the general process of refining mineral lubricating oils in which solvent extracts are obtained is well-known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent, and may be black in color. The deasphalted oil may have an API gravity of 21.5° to 21.8°, viscosity SUS 210° F. of 165–175, NPA color 6–7, flash 575° F., fire 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as blending stock, for lubricating oils, and the solvent extract, predominating in complex aromatic constituents, is distinctively useful in accordance with this invention.

For example, a crude oil from an East Texas field with an API gravity of 33.1 was topped to remove such light fractions as gasoline, naphtha, kerosine, and a light and a heavy lubricating distillate. The vacuum residue was a crude having a viscosity of 1251 SUS at 210° F., 2.2 percent total sulfur, and an API gravity of 12.6. After propane-deasphalting, the oil had a viscosity of 175 SUS at 210° F. and an API gravity of 21.7. This deasphalted oil was treated with phenol to produce a raffinate from which an aviation lubricating oil could be prepared. The oil extracted by phenol treatment, after removal of phenol, is ready for use as the starting material in accordance with this invention.

Solvents other than phenol may be used to obtain the extraction product used in accordance with this invention, for example, liquid sulfur dioxide, nitrobenzene, Chlorex, chlorophenol, cresylic acid, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

*Table I*

SOURCES AND PHYSICAL CHARACTERISTICS OF SOLVENT EXTRACTS

| Ext. No. | Crude source | Solvent | API grav. | Vis./100° F., secs. | Vis./130° F., secs. | Vis./210° F., secs. | V.I. | Pour, °F. | Flash, °F. | Fire, °F. | C.R., percent | Total sulfur, percent |
|---|---|---|---|---|---|---|---|---|---|---|---|---|
| 1 | East Texas | Phenol | 11.1 | 23,319 | 4,750 | 282 | −40 | +55 | | | 7.2 | 2.60 |
| 2 | do | do | 15.4 | 15,000 | | 285 | +39 | | | | 4.7 | 2.27 |
| 3 | do | do | 12.6 | 36,410 | 4,310 | 310.1 | −1 | +80 | | | 4.7 | 2.2 |
| 4 | do | do | 14.6 | 19,500 | 4,305 | 313 | +27 | +90 | | | 4.13 | 2.33 |
| 5 | do | do | 15.4 | 32,500 | | 372 | +5 | +60 | | | | 2.18 |
| 6 | do | do | 13.7 | 25,000 | 5,400 | 355 | +27 | +80 | | | | |
| 7 | do | do | 8.6 | 145,000 | 19,000 | 616 | 0 | +70 | | | | 2.18 |
| 8 | do | do | 10.5 | 12,676 | 2,514 | 172.1 | −101 | +60 | | | | |
| 9 | Sante Fe Springs | do | 10.2 | | | 371 | | +65 | 520 | 600 | | |
| 10 | Texas | Furfural | 13.0 | | | 1,500 | | +85 | 470 | 515 | | |
| 11 | Pennsylvania | Chlorex | 12.2 | | | 1,365 | | +85 | 560 | 630 | | |
| 12 | do | Nitrobenzene | 10.0 | | | 1,500 | | +75 | 555 | 640 | | |
| 13 | Mid Continent | Propane-cresol | 14.4 | | | 1,500 | | +100 | 540 | 605 | | |
| 14 | do | Phenol | 13.6 | | | 41.7 | −82 | +20 | | | | |
| 15 | do | Chlorex | 13.6 | | | 200 | −61 | +75 | | | | |
| 16 | do | Phenol | 8.9 | | | 569 | | +75 | | | | |
| 17 | do | Furfural | 14.9 | | | 50.2 | 25 | +20 | | | | |
| 18 | East Texas | Phenol | 13.5 | 25,000 | | 341 | 17 | +65 | 530 | 610 | 5.76 | 2.36 |
| 19 | do | do | 11.1 | 1,054 | 331 | 61.5 | −56 | +40 | 435 | 475 | 0.42 | 2.7 |
| 20 | do | do | 13.7 | 26,000 | 5,615 | 360 | +25 | +65 | 550 | 630 | 5.5 | 2.3 |
| 21 | do | do | 7.7 | 2,007 | 611 | 71.1 | −128 | +35 | 420 | 495 | 0.86 | 3.2 |
| 22 | do | do | 7.3 | 230,000 | 20,800 | 796 | −76 | +65 | 520 | 610 | 7.7 | 3.0 |
| 23 | do | do | 17.6 | 154 | 80 | 41 | 11 | +30 | 400 | 435 | 0.1 | 2.0 |

Extract No. 19 was obtained in the production of 170 High VI neutral, had an average molecular weight of 340, contained 87.0% aromatics, and 13% saturates, and averaged 2.7 aromatic rings per aromatic molecule. Its ultimate analysis was: 86.4% carbon, 10.7% hydrogen.

Extract No. 20 was obtained in the production of 150 High VI Bright Stock, had an average molecular weight of 590, and contained 86% aromatics, 14% saturates, and averaged 3.3 aromatic rings per aromatic molecule. Its ultimate analysis was: 86.2% carbon, 11.4% hydrogen.

Extract No. 21 was obtained in the production of 200 Low VI neutral, had an average molecular weight of 340, and contained 87% aromatics and 13% saturates.

Extract No. 22 was obtained in the production of 160 Low VI Bright Stock, and contained 92% aromatics and 8% saturates.

Extract No. 23 was obtained in the production of 85 VI neutral, had an average molecular weight of 300, and contained 76.8% aromatics (by the silica gel procedure).

The solvent extracts from lubricating oils used as starting materials for this invention have the following general properties and characteristics:

*Table II*

| Characteristic: | Range of value |
|---|---|
| Gravity, ° API | 7.0–18.3 |
| Specific gravity, 60° F./60° F. | 0.945–1.022 |
| Viscosity SUS @210° F. | 40–1,500 |
| Viscosity index | −128–+39 |
| Pour point (max.), ° F. | +30–+100 |
| Molecular weight, average | 300–750 |
| Boiling point, ° F. | Above 600 |
| Total sulfur, percent wt. | 0.5–4.5 |
| Sulfur compounds, percent wt. | 5–45 |
| Aromatic hydrocarbons | 25–90 |
| Av. No. of rings/mean arom. mol. | 1.7–3.5 |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of high viscosity index neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and sulfur compounds in the range of 70–95%, the remainder being principally saturates, or material behaving as saturates, together with a minor proportion of from 0.5 to 6.0% of organic acids. The organic acids present are not susceptible to extraction by the use of aqueous strong caustic because of the solubilities of the salts of the acids in the oil. Very little, if any, asphaltic material is present in solvent extracts and they contain no material volatile at room temperatures.

The materials shown in Tables I and II are merely illustrative and the invention is not to be limited thereby.

It is apparent that the composition and characteristics of the acids will vary somewhat depending on the concentration and types of polynuclear aromatic compounds in the solvent extracts used. In such complicated mixtures as solvent extracts from lubricating oil fractions, the content of aromatic materials may vary from about 25% to 90% by weight.

In using the preferred source material, namely, solvent extracts, it is to be understood that the invention is broadly applicable to any petroleum fraction which contains at least about 20% by weight of reactable polynuclear aromatic compounds as herein defined. These types of complex aromatic compounds are found in high concentrations in solvent extracts obtained in the manufacture of neutrals and bright stocks, all of which materials are to be understood as suitable starting materials.

It is to be understood that the invention is particularly applicable to any solvent extract from the refining of mineral lubricating oils for the purpose of separating nonaromatic and aromatic materials, that is, where the solvent exerts a preferential selectivity for the nonparaffinic constituents. The extracts are substantially freed of solvent, e.g., phenol extracts are dephenolized by steam stripping, so that they contain practically no solvent.

The embodiments of the invention in which an exclusive property or privilege is claimed are defined as follows:

The product, characterized by a polynuclear aromatic structure, having a molecular weight of about 300 to 750, containing about 0.5 to 4.5 weight percent of sulfur in the form of heterocyclic rings and having an average of about 1.7 to 3.5 aromatic rings per mean aromatic molecule, produced by the reaction of about 1 mol of solvent extracts obtained in the solvent extraction of mineral lubricating oils using a solvent selective for aromatic compounds with about 1 to 2 mols of an acetylating agent of the group consisting of acetic anhydride and acetyl chloride at a temperature of about 20° to 100° C. in the presence of a Friedel-Crafts catalyst to form the acetylated derivative of said solvent extracts, reacting said acetylated derivative with an aqueous alkaline solution of a salt of a hypohalous acid of the group consisting of hypochlorite, hypobromite and hypoiodite salts at a temperature of about 40° to 105° C., heating the resulting oxidized product with a petroleum solvent of the group consisting of pentane, hexane, heptane and naphtha to produce an extract phase and a viscous, clear, reddish liquid product from said extract phase.

References Cited in the file of this patent

UNITED STATES PATENTS

| | | |
|---|---|---|
| 2,195,198 | Balle et al. | Mar. 26, 1940 |
| 2,861,102 | Huff et al. | Nov. 18, 1958 |

FOREIGN PATENTS

| | | |
|---|---|---|
| 731,524 | Germany | Feb. 10, 1943 |
| 783,286 | Great Britain | Sept. 18, 1957 |
| 786,561 | Great Britain | Nov. 20, 1957 |

OTHER REFERENCES

Ellis: "Chem. of Petroleum Derivatives," vol. 2, pages 447, 448 and 450 (1937).

Gore: "Chem. Reviews," vol. 55, pages 229–281 (1955).